April 14, 1964 C. W. CLARAS ET AL 3,129,296
STEREO TAPE RECORDER SYSTEM
Filed Oct. 10, 1960
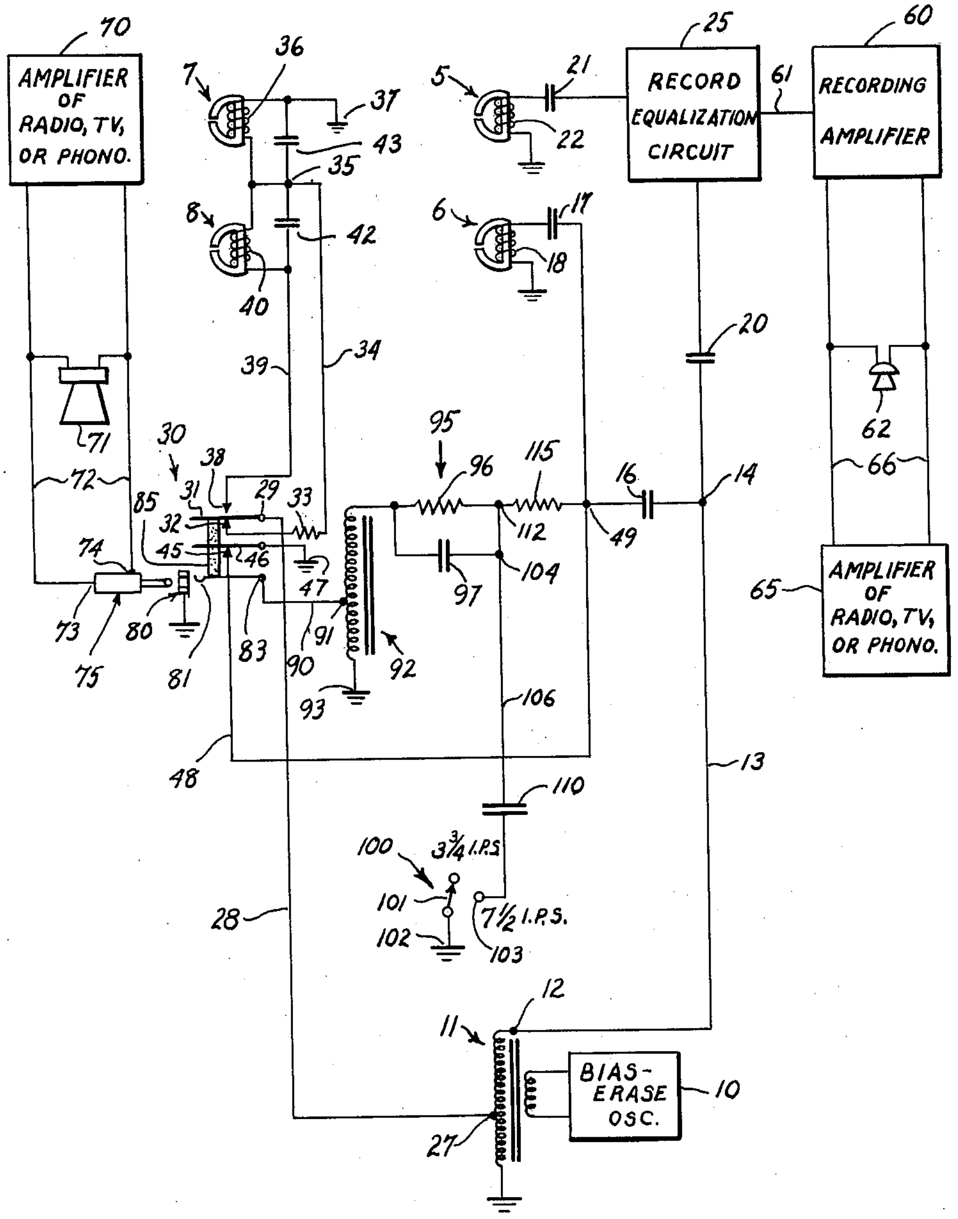
INVENTORS
Carl W. Claras
BY Theodore Wickstrom
Zabel, Baker, York, Jones + Dithmar
Attorneys United States Patent Office 3,129,296
Patented Apr. 14, 1964

3,129,296
STEREO TAPE RECORDER SYSTEM

Carl W. Claras, Western Springs, and Theodore Wickstrom, Skokie, Ill., assignors, by mesne assignments, to Minnesota Mining and Manufacturing Company, St. Paul, Minn., a corporation of Delaware
Filed Oct. 10, 1960, Ser. No. 61,662
7 Claims. (Cl. 179—100.2)

This invention relates to a stereo tape recorder system which is capable of recording stereo signals on magnetic tape but which, in commercial embodiment, involves the use of only one self-contained or internal recording amplifier.

Stereo tape recorders presently available are relatively expensive because they include two complete internal recording amplifiers. Study of the recording practices of owners of such tape recorders indicates that few, if any, microphone stereo recordings are made. The reason for this is that most owners do not have access to live orchestra or other live sound sources suitable for stereo recording.

As a result, stereo tape systems are available which are designed to permit playback of prerecorded stereo tape, but which are incapable of making stereo recordings. Such systems, at most, are capable of recording only monaural or single channel signals.

There is, however, a need for an inexpensive tape recorder system which is capable of making dual channel or stereo tape recordings from stereo phonographs or from stereo broadcasts in which, for example, the seperate channels are transmitted simultaneously from a television station and an FM radio station, or from AM and FM radio stations.

One object of this invention, therefore, is to provide a simple, inexpensive stereo tape recorder system which employs only a single self-contained or internal recording amplifier (for single channel microphone recording) but which is capable of making dual channel or stereo tape recordings from sources such as those indicated above. This is accomplished in the present system by utilizing as an essential component an external amplifier which may be the amplifier in radio or television apparatus or one of the amplifiers in a stereo phonograph.

Other objects, advantages and details of the invention will be apparent as the description proceeds, reference being had to the accompanying drawing wherein one form of the invention is shown. It will be understood that the description and drawing are illustrative only, and that the scope of the invention is to be measured by the appended claims.

In the drawing:

The single figure of the drawing illustrates in simplified form a stereo tape recorder system which employs only a single internal recording amplifier.

Referring to the drawing, the illustrated system includes an upper record head 5 and a lower record head 6. Upper erase head 7 and lower erase head 8 respectively are aligned and cooperate in conventional manner with the record heads 5 and 6.

The system also includes a conventional bias-erase oscillator 10 which is coupled in suitable manner as by transformer 11 to the record and erase heads.

Output terminal 12 of transformer 11 is connected by lead 13 to junction 14. Recording bias voltage from oscillator 10 is applied to lower record head 6 through capacitances 16 and 17 which are connected in series between junction 14 and coil 18 of the head. Similarly, recording bias voltage is applied to upper record head 5 through capacitances 20 and 21 which are connected in series between junction 14 and coil 22 of the head.

By way of specific example, capacitances 16 and 20 may have values of 150 micromicrofarads, and capacitances 17 and 21 may have values of .22 microfarad.

A conventional record equalization circuit 25 is connected in circuit between capacitances 20 and 21, and signals to be recorded by record head 5 are applied to equalization circuit 25.

Terminal 27 of transformer 11 is connected by lead 28 to apply erase voltage to erase heads 7 and 8. As here shown, lead 28 is connected to terminal 29 of a multiple switch generally designated 30. Terminal 29 is connected to movable switch blade 31.

In the switch position shown, blade 31 engages stationary switch contact 32 which is connected through resistance 33 and lead 34 to junction 35. The latter is connected to energize coil 36 of upper erase head 7, the circuit being grounded at 37. Thus, when switch 30 is in the position shown, erase voltage from bias-erase oscillator 10 is applied only to upper erase head 7.

When stereo recordings are to be made, switch blade 31 is moved, as will be seen, but out of engagement with contact 32 and into engagement with stationary contact 38. The latter is connected by lead 39 to coil 40 of lower erase head 8 which in turn is connected to coil 36 of the upper erase head. Thus, when switch 30 is in the last described switch position, both erase heads 7 and 8 are energized with erase voltage from bias-erase oscillator 10.

Capacitances 42 and 43, which may have values of 470 micromicrofarads, respectively shunt erase head coils 40 and 36 to resonate the coils to the applied frequency for increased erase efficiency.

The value of resistance 33 is selected to have the same impedance as lower erase head 8 so that there will be the same load on bias-erase oscillator 10 regardless of whether one or both of the erase heads are energized.

The illustrated multiple switch 30 also includes a stationary contact 45 and a cooperating movable switch blade 46 which is grounded at 47. Contact 45 is connected by lead 48 to junction 49, the latter being in circuit with lower record head 6.

When the system is not being used to make stereo recordings, but rather is being used to make single channel recordings, movable grounded switch blade 46 engages contact 45. Thus, lower record head 6 is shorted to ground and deactivated so extraneous signals will not be recorded on the tape by the lower record head.

The present system includes a self-contained or internal recording amplifier 60 which is connected by lead 61 to previously mentioned record equalization circuit 25. A microphone 62 connected to upper record amplifier 60 enables the present system to be used for single channel microphone recording.

A source of signals for one channel of stereo signals is designated 65. This source may be the amplifier of a radio, television or phonograph. Leads 66 extend from this signal source to recording amplifier 60, and the signals are applied to upper record head 5 through record equalization circuit 25 and capacitance 21, as previously mentioned. Thus, the signals of one stereo channel are applied to the upper track of the magnetic tape.

The signals of the other stereo channel are derived from an external source 70 which normally is the amplifier of a radio, television or phonograph. A speaker 71 driven by such amplifier is shown to illustrate the usual manner of connecting such external signal source 70 to the present stereo tape recorder system.

As illustrated, the terminals of speaker 71 are connected by leads 72 to terminals 73 and 74 of a conventional plug 75.

The present system includes a jack 80 adapted to receive plug 75. Jack 80 has a spring element 81 which is moved in response to plug 75 when the latter is positioned in the jack. Spring element 81 is connected electrically to terminal 83.

Spring element 81, switch blade 46 and switch blade 31 are ganged together by means 85 which interconnects the three elements. Thus, when spring element 81 is moved in response to the action of plug 75, switch blade 46 is moved out of engagement with switch contact 45 and switch blade 31 is moved out of engagement with switch contact 32 and into engagement with switch contact 38. The circuit established by engagement between blade 31 and contact 38 applies erase voltage to both erase heads 7 and 8, as previously mentioned. At the same time, resistance 33 is cut out of the circuit.

The second channel stereo signals from source 70 enter the system through plug 75, and appear at terminal 83. This terminal is connected by lead 90 to tap or terminal 91 of a transformer means 92. As illustrated, transformer means 92 is an autotransformer with one terminal grounded at 93. The function of transformer 92 is to raise the voltage of the incoming signals to a sufficient level for effective action of a record equalization circuit 95. Also, the increased voltage level provided by transformer 92 is desirable for certain types of record level indicators.

Record equalization circuit 95 includes resistance 96, which may have a value of one megohm, and capacitance 97. The latter, which may have a value of 100 micromicrofarads, is connected across resistance 96 to shunt the resistance at the higher frequencies, thereby causing the desired rising frequency characteristic.

If the tape recorder system is designed to operate at either of two tape speeds, for example 3¾ inches per second or 7½ inches per second, a switch 100 desirably is used in the record equalization circuit. Switch arm 101 is grounded at 102, and in the 3¾ inches per second position illustrated, switch 100 has no effect on record equalization circuit 95. However, when switch arm 101 engages terminal 103 for the 7½ inches per second tape speed, terminal 104 of the record equalization circuit is connected to ground through lead 106 and capacitance 110. The latter, which may have a value of 680 micromicrofarads, shunts capacitance 97 to ground and bypasses some of the higher frequency so there will be less high frequency boost.

Output terminal 112 of record equalization circuit 95 is connected through current limiting resistance 115 to junction 49. Resistance 115, which may have a value of 100,000 ohms, also serves as an isolating resistance to prevent bias voltage from affecting the record equalization circuit and transformer 92.

From the foregoing, it will be seen that the present tape recorder system, which employs only a single self-contained recording amplifier 60, is capable of making either single channel (monaural) recordings or dual channel (stereo) recordings.

When single channel recordings are desired from signals supplied either by external amplifier 65 or microphone 62, such signals are applied in conventional manner only to one of the record heads. In the system illustrated, these signals are applied to upper record head 5 which also is supplied simultaneously with bias voltage from oscillator 10. The other or lower record head 6 is deactivated at this time to prevent extraneous signals from being recorded on the lower tape channel.

Further, during the single channel recording only the erase head associated with the active record head is supplied with erase voltage. In the example shown, erase head 7 cooperates with single channel record head 5, and this erase head in supplied with erase voltage through switch blade 31, switch contact 32 and resistance 33. The latter, as mentioned, has an impedance comparable to the other erase head so that the erase load on oscillator 10 will be approximately the same regardless of whether one or both of the erase heads are connected in circuit with the oscillator.

When dual channel stereo recordings are desired, one signal source is connected to the system as above described with reference to single channel recording. The other signal source, i.e., external source 70, is connected to the system by plug 75 and jack 80. When this connection is established, switch 30, which is responsive to the connection, functions both to apply the second channel signals to the other record head, namely lower head 6, and to establish the circuit which applies erase voltage to the other erase head, namely lower head 8.

From the above description it is thought that the construction and advantages of the invention will be readily apparent to those skilled in the art. Various changes in detail may be made without departing from the spirit or losing the advantages of the invention.

Having thus described the invention, what I claim as new and desire to secure by Letters Patent is:

1. A stereo tape recorder system comprising upper and lower record heads and cooperating upper and lower erase heads in respective alignment therewith and on the same sides thereof, a bias-erase oscillator connected to said record heads and one of said erase heads and adapted selectively to be connected also to the other of said erase heads, switch means selectively effecting said last connection, an internal input amplifier and associated first record equalization circuit connected to the record head which cooperates with said one erase head, and means applying equalized signals of proper intensity to the other record head, said last means including an input terminal adapted to receive signals from an external amplifier, transformer means connected to said input terminal and adapted to raise the voltage of said signals, and a second record equalization circuit connected between said transformer and said other record head.

2. The combination of claim 1 with the addition of a switch connected in circuit with said other record head, said switch having means responsive to a connection between said input terminal and said external amplifier and effective to condition said other record head for recording, and means applying signals from said external amplifier to said other record head during the existence of such connection.

3. The combination of claim 2 wherein said switch means for the other of said erase heads is a part of said switch, said switch means responsive to a connection between said input terminal and said external amplifier and effective during the existence of such connection to connect said bias-erase oscillator to the other of said erase heads.

4. The combination of claim 3 with the addition of an impedance between said switch means and said one of said erase heads, said impedance generally equal to the impedance of said other of said erase heads whereby the load on said bias-erase oscillator is constant regardless of whether said other of said erase heads is connected in circuit by said switch means.

5. A stereo tape recorder system comprising upper and lower record heads and cooperating upper and lower erase heads in respective alignment therewith and on the same sides thereof, a bias-erase oscillator connected to said record heads and adapted to be connected selectively to one or both of said erase heads, switch means connecting said bias-erase oscillator selectively to one or both of said erase heads, an internal input amplifier and associated first record equalization circuit connected to one of said record heads, and means applying equalized signals of proper intensity to the other record head, said last means including an input terminal adapted to receive signals from an external amplifier, and a second record equalization circuit connected between said terminal and said other record head.

6. The combination of claim 5 wherein said switch means includes means responsive to connection between said input terminal and the external amplifier and effective during the existence of such connection to connect said bias-erase oscillator to both of said erase heads.

7. The combination of claim 5 wherein said switch means includes means responsive to connection between said input terminal and the external amplifier and effective during absence of such connection to deactivate said other record head.

References Cited in the file of this patent

UNITED STATES PATENTS

| | | |
|---|---|---|
| 2,561,338 | Camras | July 24, 1951 |